Jan. 24, 1961 K. FEARNSIDE 2,969,536
CONTROL SYSTEMS FOR STEERING DIRIGBLE CRAFT
Filed May 6, 1955 3 Sheets-Sheet 1

INV.
KENNETH FEARNSIDE
By Moore and Hall
Attys.

INV.
KENNETH FEARNSIDE

By Moore and Hall
Attys.

United States Patent Office 2,969,536
Patented Jan. 24, 1961

2,969,536
CONTROL SYSTEMS FOR STEERING DIRIGIBLE CRAFT

Kenneth Fearnside, The Causeway, Bredon, Tewkesbury, Gloucestershire, England

Filed May 6, 1955, Ser. No. 506,451

9 Claims. (Cl. 343—7)

The present invention relates to control systems in which a dirigible craft is steered under the control of a signal dependent upon its orientation. Such a signal may be derived in a variety of ways, for example from radar equipment carried upon the craft; but it is almost inevitable that, however it is derived, it carries in addition to the wanted information as to vehicle orientation spurious information, or "noise." This noise entering the control system may have various undesirable effects—for example, it may in unfavourable circumstances cause the wanted information to be lost owing to saturation of amplifying devices to which the signal is applied. The frequency-spectrum of the noise often tends to be higher than that of the wanted information; and it has frequently been the practice to apply the crude noisy signal to a conventional low pass filter network. This results in the attenuation of the relative to the signal, but also results in the introduction of undesirable phase lag in the wanted information.

It is accordingly an object of the present invention to provide a control system in which a dirigible craft is steered under the control of a signal dependent upon its orientation wherein the effect of noise in the signal is reduced without the introduction of excessive phase lag in the wanted information.

According to the present invention, in a control system in which a dirigible craft is steered under the control of an input signal containing wanted components dependent upon its orientation, and also possibly unwanted components, filter means are provided to give a filtered signal proportional to the mean of short term means of the positive and negative peaks of the signal and the filtered signal is utilised to control the operation of the appropriate control surfaces of the craft.

A "short term mean" of a quantity is defined as being a further quantity substantially proportional to the average value of the quantity over a preceding short space of time. For example the output of a conventional peak rectifying diode circuit is a short term mean of the positive (or negative) peaks of an amplitude modulated carrier signal applied to the input, variations of a short period compared with the time constant of the usual load circuit being averaged out to zero and variations of a long period appearing as an output signal.

Preferably, when the input signal is in the form of a fluctuating electric voltage, it is applied to two peak rectifying circuits, generally similar but arranged to be responsive to positive and negative voltage peaks respectively, the mean of the outputs of the rectifying circuits then provides the filtered signal. In such an arrangement the time-constants of the rectifying circuits may be such that the maximum rate of decay of the rectifier output voltage is of the same order as the maximum rate of change of wanted signal components. Alternatively they may be chosen, when the signal is obtained from radar equipment, to give the most favourable action in relation to spurious oscillations arising from radome aberrations, in a manner discussed below.

A system embodying the invention, in which it is applied to the direction of a craft in a plane towards a target under the control of signals derived from radar equipment carried on the craft will now be described with respect to the accompanying drawings of which:

Figure 1:
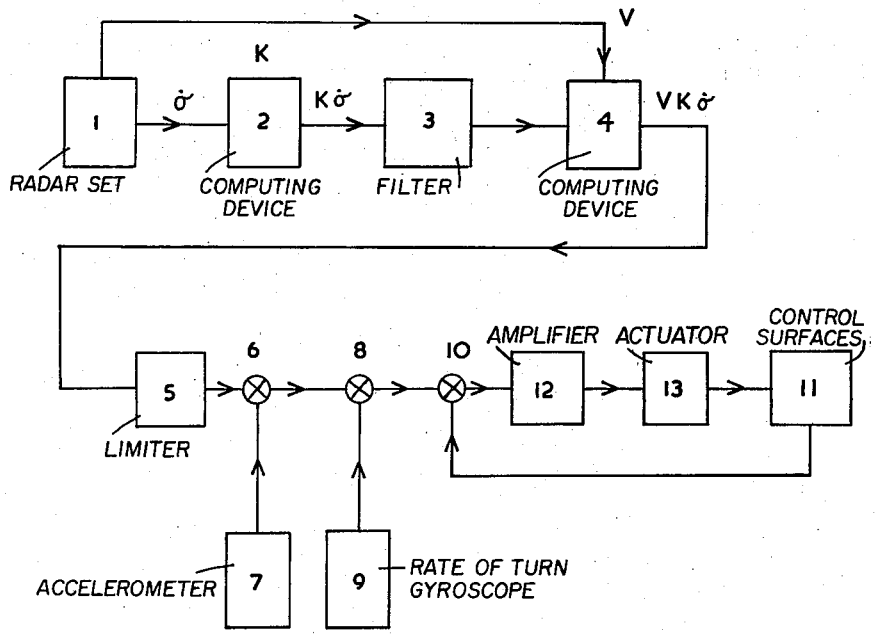
Figure 1 shows a block schematic diagram of the system.

Figure 5 is a schematic showing of a waveform chart showing the general characteristics of an input signal which is filtered according to the present invention The system utilises the procedure sometimes known as "normalised proportional navigation," that is to say the craft is so controlled that the rate of turn of the relative velocity vector of the craft and target in the plane is substantially a constant multiple, greater than unity (the multiplier being known as the "navigational constant"), of the rate of turn in the plane of the sight line joining the craft and the target. It is known that a control of this nature results in the guidance of the craft to the target. The rate of turn of the relative velocity vector may conveniently be ascertained from the lateral acceleration of the craft, suitably resolved, it being known from elementary kinematical considerations that the lateral acceleration is equal to the velocity of the craft along its path multiplied by its angular velocity. The rate of turn of the sight line is obtained by means of radar equipment, the electrical signal from the radar equipment containing information as to this being almost inevitably noisy. Although this signal is derived from radar equipment it is not the conventional output of a radio receiver consisting of unidirectional pulses together with the usual noise, but a signal derived by strobing a particular echo, making measurements of its bearing and deriving a signal representing the rate of turn of the line of sight to the target from the craft. One way of deriving bearing signals is, for example, by using the well-known conical scanning of a radar beam and generating elevation and bearing misalignment signals. These misalignment signals are usually continuous signals and may be either D.C. or A.C. signals of varying amplitude. The electrical signal derived from the radar represents the rate of change of the misalignment signals and may vary on either side of zero, giving positive and negative peaks. It has been found that even when the radar echo signal has been cleaned of random noise or "grass" (a) fluctuations in echo amplitude, (b) unsteadiness of the craft, and (c) radome aberration, can cause fluctuations or even spurious oscillations to occur in the electric signal supplied from the radar equipment. This signal is first multiplied by the navigational constant, and then filtered in accordance with the invention to reduce the effects of noise and also to reduce the instability-producing effects of radome aberrations. It is then multiplied by the magnitude of the relative velocity vector (determined by the radar equipment) to give the transverse acceleration which the craft must have if the desired relationship between rate of turn of relative velocity vector and rate of turn of line of sight is to be attained and then limited, to prevent excessive acceleration demands from being made. The acceleration demand is compared with the actual lateral acceleration. The control surfaces of the craft are then actuated to make the actual lateral acceleration of the craft equal to the demanded lateral acceleration, and thus to attain the desired relationship between the rate of turn of the sight line and the rate of turn of the relative velocity vector. The control surfaces are also actuated in accordance with the rate of turn of the craft, as determined by a conventional resiliently-restrained gyroscope, to damp oscillation of the craft about the desired path.

Figure 3:
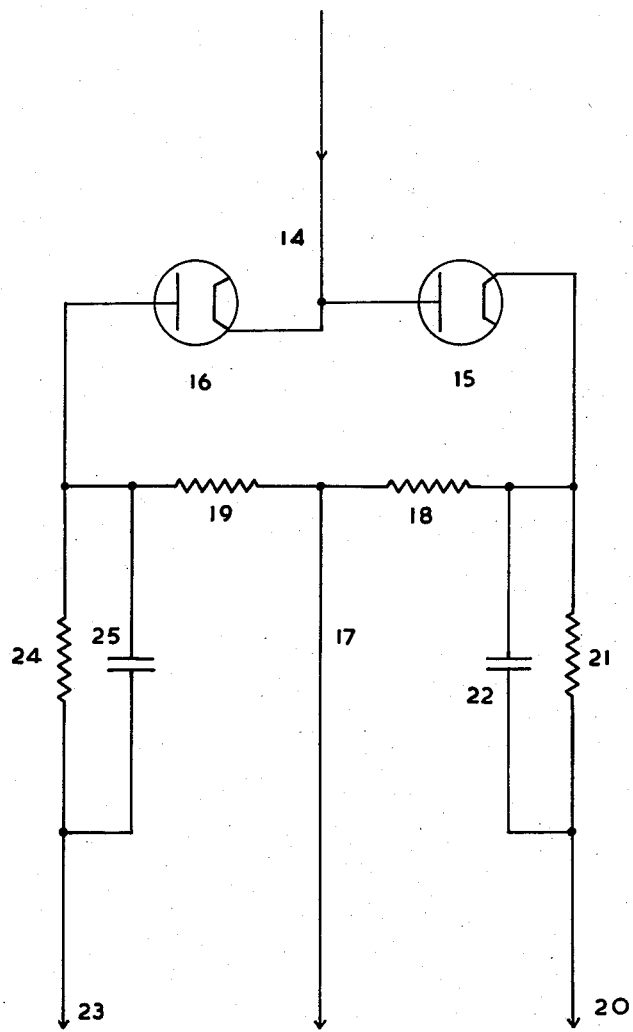
Figure 3 shows a circuit diagram of the filter indicated by block 3 in Figure 1.

A radar set 1 mounted on the craft has a scanner of the kind described in co-pending United States application No. 358,203. The radar set scanner is mounted, in the nose of the craft, behind the conventional protective cover or "radome." The radar set gives, as described in the earlier-mentioned specification, a signal proportional to the rate of rotation in space of the sight line joining the target and the craft, denoted by $\dot\sigma$, and also a signal proportional to the speed of the vehicle relative to the target, "V." The $\dot\sigma$ signal is multiplied by the navigational constant, K, in a computing device, indicated at 2. The output from computing device 2 indicates the demanded rate of turn of the relative velocity vector and is applied to a filter 3, shown in detail in Figure 3, giving an output substantially in accordance with the mean of short term means of the positive and negative peaks of the K$\sigma$ signal. The output from filter 3 is multiplied, in a computing device indicated at 4, by the speed of the vehicle relative to the target, V, utilising the "V" signal from radar set 1. The output from computer 4 is applied to a conventional limiter 5 (comprising, conveniently, suitably biassed diodes). The output from limiter 5 constitutes an acceleration demand signal, the limiter 5 preventing the occurrence of acceleration demands likely to damage the craft, and is applied to one input of a first differential device 6. The output from an accelerometer 7, mounted on the craft so as to be responsive to accelerations in the plane of motion transverse to the relative velocity vector, is applied to the other input of differential 6. The difference between the demanded and the actual acceleration is combined by means of a second differential 8 with the output from a gyroscope 9 responsive to rate of turn of the craft in the plane to give a control surface displacement demand signal. This signal is applied to one input of a third differential 10, to whose other input is applied a signal in accordance with displacement from a datum position of a control surface, indicated at 11, adapted to control the craft in the plane. The output from differential 10 is applied to an amplifier 12 whose output in turn controls an actuator 13 positioning control surface 11. Thus the control surface is actuated to steer the craft towards the taregt.

The operation as so far described takes no account of radome aberrations, which result in motion of the apparent sight line as detemined by the radar set 1 should there be any oscillation of the body about an axis normal to the plane of motion. Any such motion results in actuation of the control surfaces, so that the aberration may readily lead to an oscillation about the axis, commonly known as a "weathercock oscillation." This will be appreciated from an inspection of Figure 2, which shows schematically the essential parts of the feed-back loop in which the oscillation may occur. A measure of radome aberration is provided by a parameter, usually denoted as $\mu$, defined as follows—if the actual angle between sight line and vehicle axis is $\theta$, the angle as measured by the radar equipment is $\theta'$, $\theta$ and $\theta'$ will be substantially proportional to each other and very nearly equal. That is to say, the relationship between them can be put in the form:

$$\theta = \theta'(1-\delta)$$

where $\delta$ is a small constant quantity much less than unity. This equation, for a given installation, defines the quantity $\delta$. However, in the present case it is convenient to refer to a further quantity $\mu$, nearly equal to $\delta$, and defined by the following equation:

$$\mu = \frac{\delta}{1-\delta}$$

Figure 2:
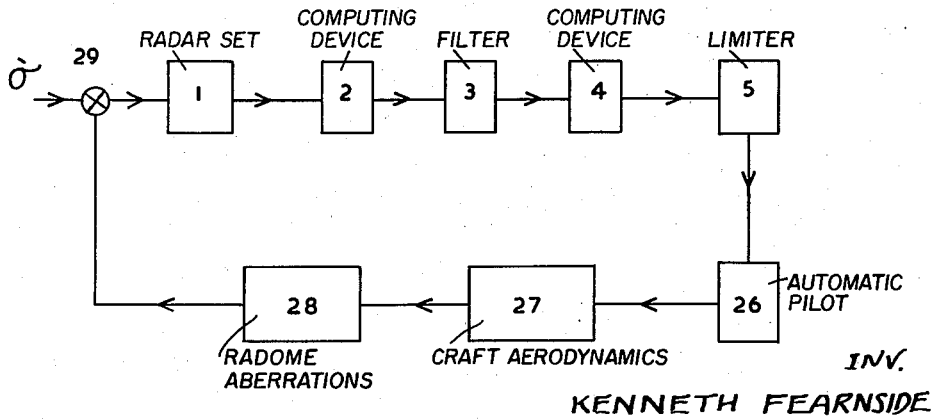
Figure 2 shows, schematically a feed-back loop in which oscillations due to radome aberrations may occur.

In Figure 2 certain of the elements of Figure 1 appear. Block 26 indicates the combination of blocks 7, 9, 11, 12, 13 which effectively form an automatic pilot for the craft. The automatic pilot produces, by reason of the aerodynamics of the craft indicated symbolically by block 27, motion of the craft, and this motion produces, by reason of the radome aberrations indicated symbolically by block 28, apparent departure of the value of $\dot\sigma$ from its actual value that is to say, if the craft is rotated (as it will be by operation of the control surfaces) the apparent rate of movement of the sight line, as determined by the radar set, will be due partly to the actual rate of movement of the sight line, caused by the craft rotation, and partly to the varying refraction of the radiation from the radar set by the material of the radome. This effect is indicated by the subtraction of the output of block 28 from the actual value of $\dot\sigma$ by a differential 29. The transfer function of block 28 that is to say, the relation of the apparent movement of the line of sight to the actual rotation of the craft can be shown to be dependent upon the parameter $\mu$, defined above. Blocks 1, 2, 3, 4, 5, 26, 27, 28 thus constitute a closed loop feed-back system. The criteria for stability, and for the occurrence of oscillations in, such a system are well known, being discussed for example, in "Theory of Servomechanisms" by James Nichols and Philips, published by McGraw-Hill 1947, see in particular pages 58 to 72, and it will be appreciated that the larger the value of $\mu$ the greater the likelihood of an unwanted oscillation occurring in the loop of Figure 2.

The crude rate of turn of relative velocity vector demand signal, which contains substantial noise components and may contain oscillatory components generated in the loop of Figure 2 in addition to the components due to the relative motion of the craft and target, appears between line 14 and earth and is applied to the junction of the anode of a first diode 15 and the cathode of a second similar diode 16. The cathode of diode 15 is connected to output line 17 through a first resistor 18 and the anode of diode 16 is connected to line 17 through a second resistor 19, equal to the first. The cathode of diode 15 is also connected to a point 20, at a negative potential with respect to earth which is large compared with any expected magnitude of the input, through a third resistor 21 and a first capacitor 22 in parallel therewith. The anode of diode 16 is connected to a point 23 at a positive potential, equal and opposite to the negative potential of point 20, with respect to earth, through a fourth resistor 24 and a second capacitor 25 in parallel therewith. The third and fourth resistors are equal, as are the first and second capacitors.

It will be seen that each of the diodes is connected in a peak rectifying circuit, the first being responsive to positive-going peaks and the second to negative-going peaks. It will also be seen that the discharge of capacitors 22 and 25 will be substantially linear (in the intervals when the diodes are not conducting) the rate of discharge being dependent upon the values of resistors 21 and 24 and capacitors 22 and 25 and the potentials of points 20 and 23. This rate of discharge will be denoted for convenience as $\epsilon$. $\epsilon$ may be so chosen that the rate of discharge of the capacitors is approximately equal to the maximum rate of change of any signal component representing genuine demanded acceleration (as distinct from noise) which is likely to appear in the input to the filter. Components in the input of a frequency and amplitude such that this rate is not exceeded will appear at the output with comparatively little attenuation and phase-lag, but other components will be attenuated substantially. For example, if a sinusoidal signal of fixed frequency and increasing amplitude is applied to the input the output will, for small amplitudes, be proportional to the input, but for large amplitudes it will tend asymptotically to a fixed amplitude square wave. It can in fact be shown that transmission through the filter, that is to say the ratio of the output to the input, or the gain, and the phase shift, is dependent upon the parameter $$\frac{A\omega}{\epsilon}$$

where A is the amplitude and $\omega/2\pi$ the frequency of an input applied thereto.

Figure 4:
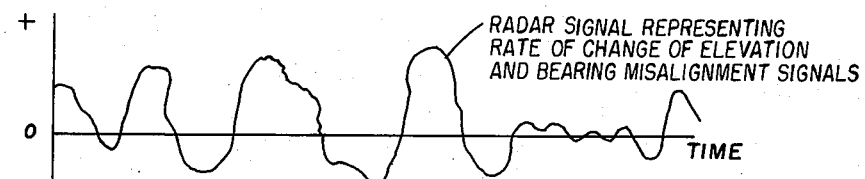
Figure 4 shows the manner in which the amplitude and frequency of oscillations due to radome aberrations may be determined in a system in accordance with the invention.
Figure 4:
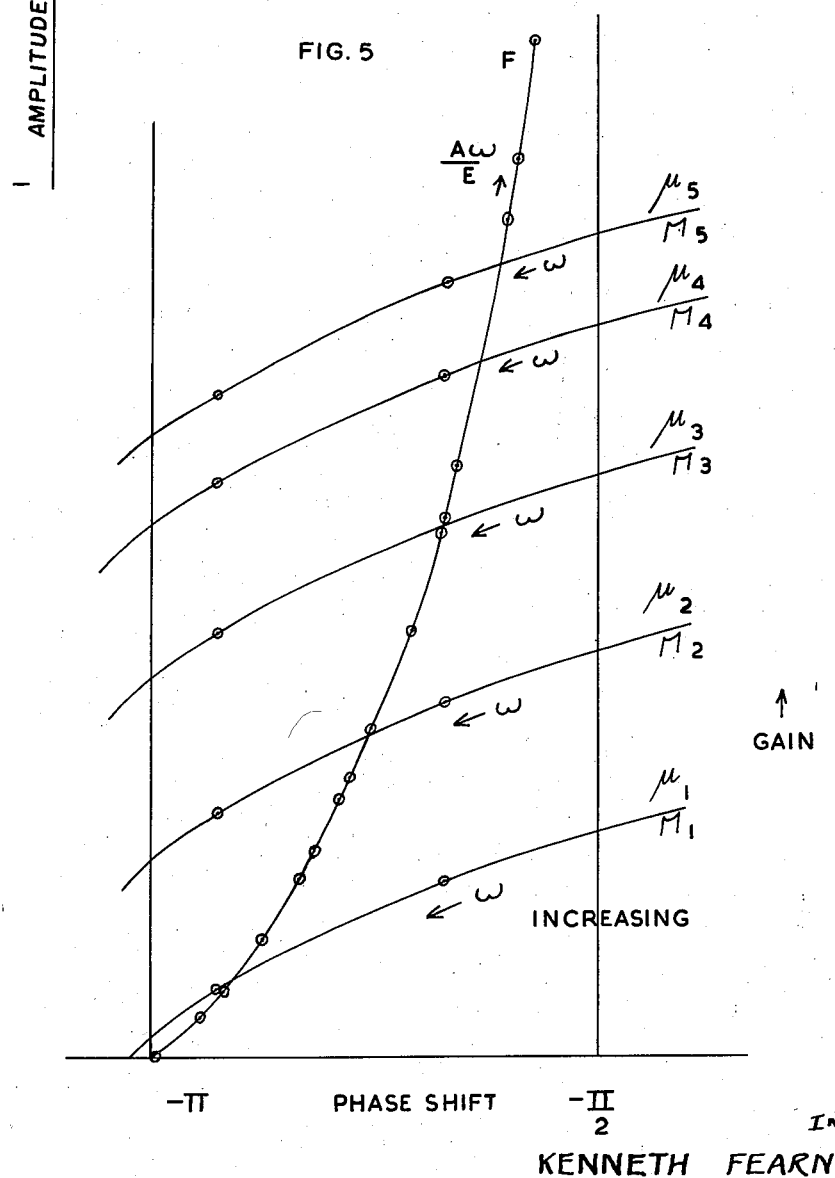

Referring now to Figure 4, the curves $M_1$, $M_2$ etc. show the manner in which gain and phase change round the loop of Figure 2, imagined to be broken at one point and with filter 4 removed, vary with frequency for various increasing values of $\mu$, $\mu_1$, $\mu_2$ etc., the gain being plotted logarithmically and one point on each curve corresponding to a value of $\omega$ in a typical system. It will be seen that in each case by the usual criteria the loop would be unstable for the values of $\mu$ shown. The curve F shows the manner in which the reciprocal of the gain and the quantity (phase-shift minus $\pi$) varies for the filter 3. Each point on this curve corresponds to a value of the quantity $$\frac{A\omega}{\epsilon}$$

mentioned earlier. It will be appreciated therefore that if filter 3 is inserted in the loop and the loop closed steady oscillation will occur whose $\omega$ and amplitude are determined by the intersection of curve F and the appropriate M curve for the value of $\mu$ and the value of $\epsilon$. The value of $\omega$ will be determined by the position of the intersection along the M curve and the value of amplitude at the input of filter 3 will be determined by the value of $$\frac{A\omega}{\epsilon}$$

on curve F at the intersection. M curves corresponding to those of Figure 4 are obtainable for negative values of $\mu$ and the frequencies and amplitudes of steady oscillations obtained similarly from them.

It will be seen that, by appropriate choice of $\epsilon$, the amplitude of steady oscillation may be determined.

In any practical case it will be desirable to choose a value of $\epsilon$ which is satisfactory from the points of view of noise suppression, phase shift, and the maintenance of oscillations due to radome aberrations at a satisfactorily small amplitude.

I claim:

1. A control system for steering a dirigible craft comprising means to generate an input signal dependent upon the craft orientation, and filter means to the input of which the said input signal is applied to give at the filter output a filtered signal proportional to the mean of short term means of the positive and negative peaks of the input signal and means to control the operation of the appropriate control surfaces of the craft in accordance with the filtered signal.

2. A system as claimed in claim 1 wherein the input signal is in the form of a fluctuating electric voltage and the filter means comprise two generally similar peak rectifying circuits arranged to be responsive to positive and negative voltage peaks respectively and means are provided to obtain a mean of the voltage outputs of the rectifying circuits, the said mean constituting the filtered signal.

3. A system as claimed in claim 2 wherein the means to generate the input signal comprise radar equipment carried on the craft.

4. A system as claimed in claim 3 wherein the wanted components of the signal voltage are proportional to the rate of rotation of the line of sight joining the craft and a target engaged by the radar equipment.

5. A system as claimed in claim 4 wherein the means to control the control surfaces of the craft are such as to make the rate of rotation of the relative velocity vector substantially equal to the product of a factor greater than unity and the rate of rotation of the sight line.

6. A system as claimed in claim 5 wherein means are provided to multiply the filtered signal by the relative velocity of the craft and target to give an acceleration demand signal, and the means to control the control surfaces comprise an accelerometer mounted on the craft, the accelerometer giving an acceleration signal proportional to the actual transverse acceleration of the craft, the system operating the control surface in accordance with the difference between the acceleration demand signal and the actual acceleration signal to reduce the difference to zero.

7. A system as claimed in claim 6 wherein the means to control the control surfaces comprise also a rate of turn responsive device mounted upon the craft, giving a signal proportional to rate of turn, the system operating the control surfaces also in accordance with the rate of turn signal to damp oscillatory motion of the craft.

8. A control system for steering a dirigible craft towards a target comprising target position responsive means on the craft, said target position responsive means providing an electric signal of varying amplitude, the variations in amplitude being dependent upon the rate of turn of a line of sight joining the craft and the target, a filter to which the said electric signal is applied, said filter having two generally similar peak rectifying circuits responsive to positive and negative peaks of the electric signal respectively and means to obtain a mean of the outputs of the rectifying circuits, which said mean comprises a filter output signal, a computer to multiply the filter output signal by the relative velocity of the craft and target to give an acceleration demand signal, an accelerometer to give an acceleration signal proportional to the transverse acceleration of the craft, a differential device giving an output proportional to the difference between said acceleration and acceleration demand signals, and means to operate the control surfaces of the craft to reduce the said difference to zero.

9. A control system for steering a dirigible craft towards a target, comprising radar equipment having a scanner mounted behind a radome mounted upon the craft and constructed to give an electric signal of varying amplitude dependent upon the orientation of the target relative to the craft but subject also to fluctuations due to radome aberrations, a filter to which the said electric signal is applied, said filter having two generally similar peak rectifying circuits responsive to positive and negative peaks of the electric signal respctively and means to obtain a mean of the outputs of the rectifying circuits, which said mean constitutes a filter output signal, means to generate a signal dependent upon the orientation of the craft in space, and means to control control surfaces of the craft by said filter output and orientation signals to guide the craft to the target, the said filter serving to inhibit oscillations of the craft caused by fluctuations in the electric signal due to radome aberrations.

References Cited in the file of this patent

UNITED STATES PATENTS

| | | |
|---|---|---|
| 2,420,017 | Sanders | May 6, 1947 |
| 2,445,773 | Frost | July 27, 1948 |
| 2,554,188 | Guanella | May 22, 1951 |
| 2,668,233 | Moses | Feb. 2, 1954 |
| 2,751,542 | Woodward | June 19, 1956 |
| 2,784,401 | Dove | Mar. 5, 1957 |